United States Patent [19]

Brown

[11] Patent Number: 4,729,247
[45] Date of Patent: Mar. 8, 1988

[54] UNIVERSAL DOPPLER FLOWMETER TESTER

[75] Inventor: Alvin E. Brown, Santa Cruz, Calif.
[73] Assignee: Manning Technologies, Inc., Scotts Valley, Calif.
[21] Appl. No.: 944,379
[22] Filed: Dec. 19, 1986
[51] Int. Cl.⁴ .......................... G01F 25/00; G01F 1/66
[52] U.S. Cl. ........................................... 73/866.4; 73/3; 73/861.25
[58] Field of Search ...................... 73/3, 866.4, 861.25

[56] References Cited
U.S. PATENT DOCUMENTS
4,579,005  4/1986  Brown ............................. 73/861.25

Primary Examiner—Tom Noland
Attorney, Agent, or Firm—Thomas Schneck

[57] ABSTRACT

A circuit simulating the electrical signal response of a flowing liquid whose velocity is to be measured by a Doppler flowmeter. The circuit takes the electrical flowmeter transmit signal from a Doppler flowmeter and modifies its frequency to derive a simulated Doppler shifted signal. The latter signal is used to modulate the transmit signal in a double side band, balanced modulator which suppresses the frequency of the transmit signal and produces upper and lower side band frequencies mimicking a Doppler shifted return signal. The latter signal is fed to the signal receiving transducer of a Doppler flowmeter for test purposes.

16 Claims, 3 Drawing Figures

UNIVERSAL DOPPLER FLOWMETER TESTER

TECHNICAL FIELD

The invention relates to electrical circuits for testing the response of a Doppler ultrasonic flowmeter.

BACKGROUND ART

Doppler flowmeters measure the velocity of sonic scattering material in a pipe or other conduit relative to the geometry of the sound source and sound receiver of the measuring system. A single crystal Doppler flowmeter is disclosed in U.S. Pat. No. 4,579,005 to A. Brown, assigned to the assignee herein. Other Doppler flowmeters for the same purpose involve two crystals, one for transmitting and one for receiving.

Typically, a continuous ultrasonic wave transmitter, known as a transducer, directs sound into a flowing medium containing particles or bubbles which reflect or scatter the sound back to a sonic receiver. The received sound has been shifted in frequency as a function of the moving scatterers. This can be expressed by the equation:

$$f_d = \frac{2V}{C} \cdot f_o \qquad (1)$$

where:
$f_d$ = Doppler frequency
v = velocity component of flow subtended by sonic beam
c = speed of sound in medium
$f_o$ = transmitted frequency It should be understood that v is a vector component of velocity of the scattering particles in the flowing medium in a direction relative to the transmitter.

Presently, to accurately test or calibrate a Doppler ultrasonic flowmeter, a pipe of known characteristics is needed having a known flow velocity for a specific fluid, such as water. Many times a person desiring to test a flow meter does not have such a pipe available and so an inaccurate test or calibration is performed.

Previously, circuits have been devised for Doppler flowmeters which simulate flow. Typically, a flow simulator is merely an audio oscillator which is not calibrated and not a good simulator.

An object of the invention is to devise an accurate universal Doppler flowmeter tester or calibration circuit which simulates liquid flow in a pipe.

DISCLOSURE OF INVENTION

The above objects have been achieved with an electrical apparatus which simulates a Doppler signal, entirely electrically, mimicking the signal response of a pipe of known characteristics carrying a known flow velocity of a specific fluid. The apparatus employs a circuit receiving as an input from a Doppler flowmeter the Doppler transmit signal, having a frequency which is modified to obtain a simulated Doppler shifted signal. Then, the simulated Doppler shifted signal is used to modulate the transmit signal with a modulator which suppresses the transmit frequency and produces frequencies above and below the transmit frequency. There is now a new electrical signal at the modulator output which mimics the signal response of a pipe of known characteristics carrying a known flow velocity of a specific fluid.

Mathematically, the simulated signal can be expressed as $$f_d' = x\, f_o \qquad (2)$$

where
$f_d'$ = simulated Doppler signal, and
x = division rate of the multiplier.

If the Doppler frequencies of equations (1) and (2) are set equal to each other, the following is obtained:

$$x f_o = (2v/c) f_o \qquad (3)$$

$$\text{or } v = x(c/2) \qquad (4)$$

There has now been produced a signal representing a fixed velocity independent of transmitter frequency. It is therefore possible to use the simulator of the present invention with any Doppler flowmeter, i.e. a universal Doppler flowmeter tester.

The tester, described above is implemented in a circuit in which a BCD multiplier is connected to receive as an input a Doppler transmit signal. The multiplier operates on this signal to produce a simulated Doppler shifted signal which is passed to a double side band, balanced modulator. The modulator also receives the Doppler transmit signal, which is now modulated at the simulated Doppler shifted signal rate. The output signal is frequency independent, and because of the side band modulation, resembles a Doppler shifted return signal.

With this circuit, a person testing or calibrating a Doppler flowmeter need not employ a pipe full of fluid flowing at a known velocity. Rather, any Doppler flowmeter can be readily calibrated, usually more accurately than previously.

BEST MODE FOR CARRYING OUT THE INVENTION

Figure 1:
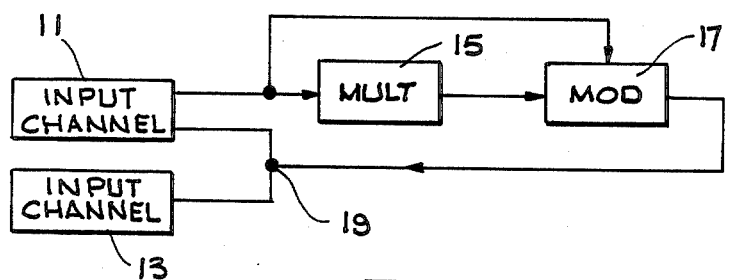
FIG. 1 is a simplified plan for the circuit of the present invention.

With reference to FIG. 1, a pair of inputs 11 and 13 are shown. These inputs are connectors adapted to communicate with a Doppler flowmeter. In the case of a single crystal flowmeter, input 11 communicates both transmit and receive signals from such a flowmeter. In the case of a dual crystal flowmeter, input 11 is connected to the transmit circuit and input 13 is connected to the receive circuit. Inputs 11 and 13 typically bridge or tap electrical connections in lieu of the crystals in a Doppler flowmeter, but do not supplant the Doppler flowmeter itself. Rather, by bridging the crystal circuit, the circuit of the present invention receives electrical input signals which are modified to simulate the electrical return signal from a transducer placed in a pipe carrying water or other liquid at a predetermined velocity relative to the fixed flowmeter crystal or crystals.

The input frequency $f_o$ emerges from input 11 as a fixed frequency pulse signal and is transmitted to binary rate multiplier 15 which preferably multiplies the signal by some value which is greater than 0 but less than 1. This multiplication range produces a reduction in the characteristic frequency, $f_o$. While an increase in the characteristic frequency is also possible by multiplying by numbers greater than one, such increases are not preferred. The multiplier value is selected to represent a shift in Doppler velocity, on a percentage basis over the length of a particular path in which the flowmeter is typically used. For example, a one percent shift of a one foot per second flow rate, gives a value of 0.01 feet per second. This represents the flow resolution observable by the instrument and is set into multiplier 15 by means of variable elements, such as BCD switches.

The multiplier 15 has the effect of reducing the transmitter frequency appearing at input 11 to some mathematically known value. This lower frequency signal is transmitted to a modulator 17 which also receives the input frequency signal from the Doppler flowmeter, i.e. the flowmeter transmit signal. The lower frequency signal is used to modulate the input frequency signal and produce an output signal satisfying equation (2). The circuit will now produce a signal from which a simulated Doppler velocity can be determined in accord with the equation (4), assuming that the speed of sound in the fluid to be actually used is known. The output signal is delivered to output node 19 where it may be passed to terminal 13 in the case of a dual crystal Doppler flowmeter or back to terminal 11 in the case of a single crystal Doppler flowmeter.

Figure 2:
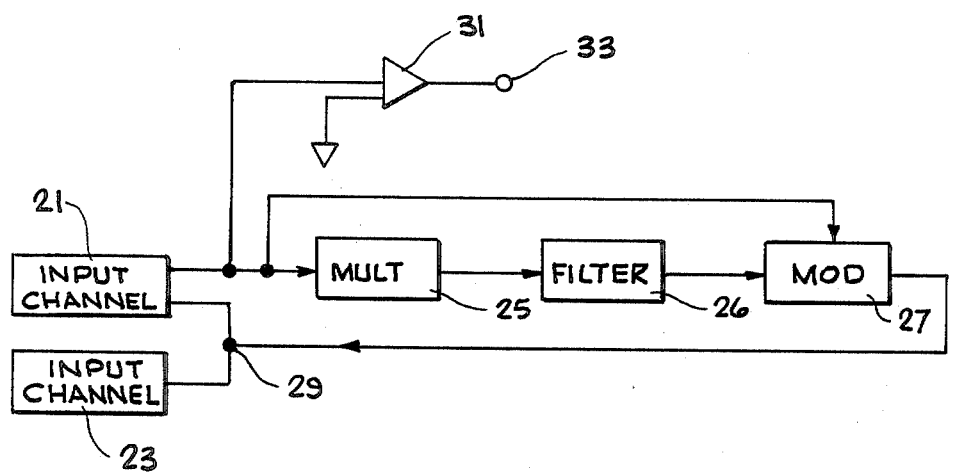
FIG. 2 is another plan for the circuit of the present invention.

With reference to FIG. 2, a similar circuit is shown having input channels 21 and 23 corresponding to input channels 11 and 13 in FIG. 1. Multiplier 25 and modulator 17 correspond to similar components 15 and 17 in FIG. 1. Now, however, a low pass filter 26 is interposed between the multiplier and the modulator. The purpose of filter 26 is to convert a square wave input from BCD multiplier 25 to an approximate sinusoidal wave for impressing upon modulator 27. If a square wave were used in the modulator, a number of harmonics of the fundamental frequency would be produced. Since some Doppler flowmeters are sensitive to multi-spectral Doppler signals, the resultant signal would be confusing. A multi-spectral Doppler flowmeter is disclosed in U.S. Pat. No. 4,579,005, to A. Brown and assigned to the assignee of the present invention. A low pass filter, operated at cutoff, provides a sinusoidal wave so that the modulator output has a sinusoidal envelope. This output is delivered to output node 29 where again the output is delivered either to a single crystal or dual crystal Doppler flowmeter.

It should be noted that the flowmeter beam angle must be taken into account in equation (1). For example, for a flow resolution of 0.01 feet per second, with a beam at 78 degrees to the flow and a sound speed of 4500 feet per second, the following equation results starting from equation (4) and solving for X.

$$X = 2(V \cos \theta)/C = 2(0.01 \cos 78°)/4500 \quad (5)$$

$$X = 9.2 \times 10^{-7} \quad (6)$$

$$X \approx 1 \times 10^{-6} \quad (7)$$

if we assume that a circuit preceding the filter divides the signal down by a factor of 100 for the purpose of operating the filter at cutoff, the finest division of the binary rate multiplier should be one part in $10^4$, or 0.0001.

As another example, if a Doppler probe is used where the beam angle relative to flow is zero, as shown in the above mentioned U.S. Pat. No. 4,579,005, the Doppler frequency is much higher. If we assume that there is no division other than the previously mentioned division by 100 preceding the filter, flow can be simulated as follows:

$$V = X(C/2) = (0.01)(4500)/2 \quad (8)$$

$$V = 22.5 \text{ ft./sec.} \quad (9)$$

To accomplish the above a four-stage BCD rate multiplier is advisable.

A signal strength amplifier 31 is connected to the signal input line to provide an output voltage proportional to the transmitter signal strength. This is not required by the invention, but provides a convenient test node 33 for measuring the transmit crystal signal strength.

Figure 3:
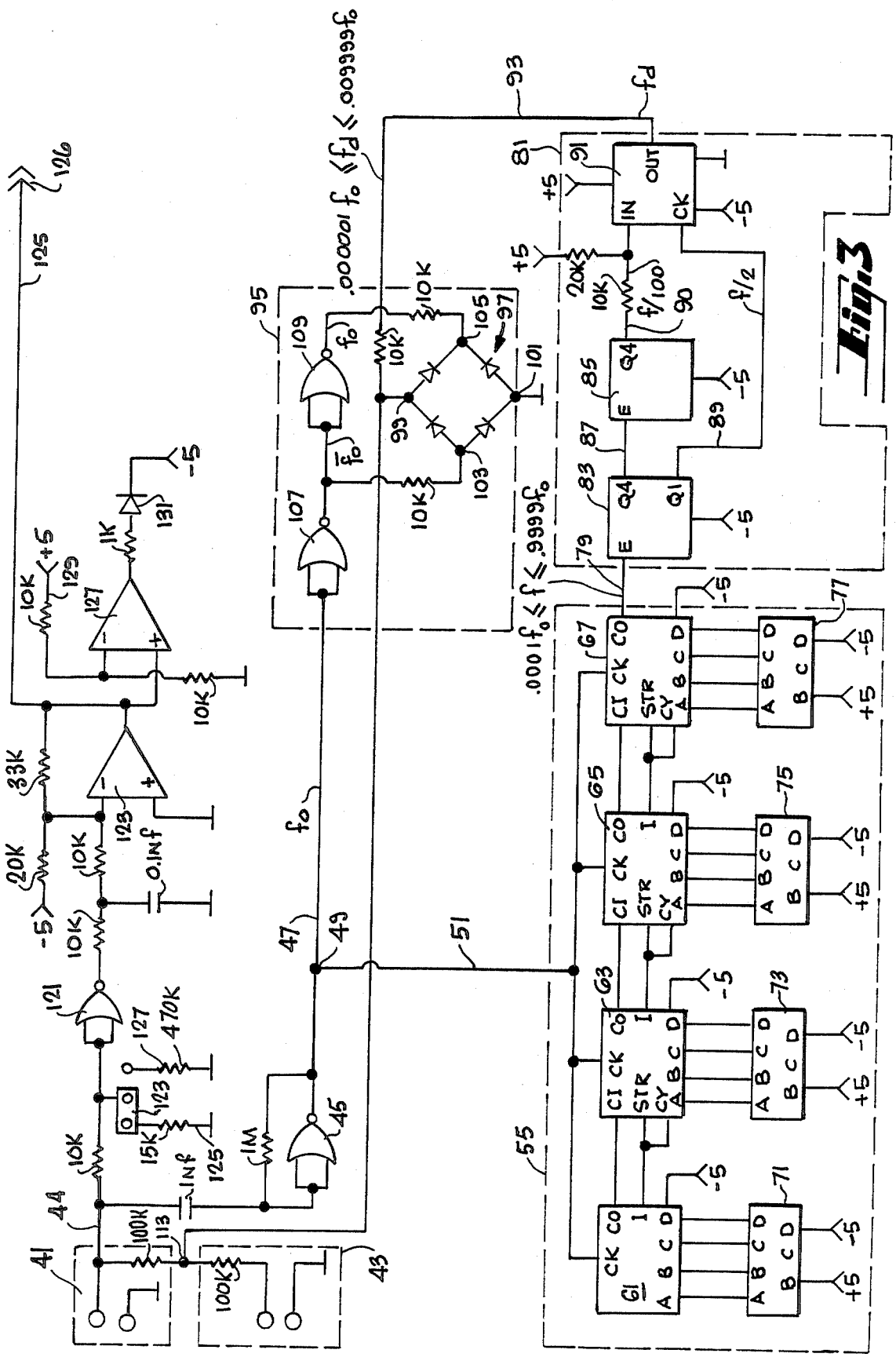
FIG. 3 is a detailed schematic for the circuit of the present invention.

The present invention is described in more detail in the schematic of FIG. 3. With reference to FIG. 3, a pair of input terminals 41 and 43 is shown. Both inputs are used where signals from a dual crystal Doppler flowmeter are available as inputs. Where only a single crystal input is available, only one input terminal 41 is utilized. A single crystal Doppler flowmeter, for both transmit and receive pulses, is described in U.S. Pat. No. 4,579,005, mentioned above. Generally speaking, dual crystal Doppler flowmeters possess a greater sensitivity. For a dual crystal apparatus, the input means 41 would be connected to the transmit circuit while input 43 would be connected to the receive circuit. The output or transmit frequency $f_o$ emerges along line 44 and is directed to inverter 45 which has a function of converting the input signal to compatible logic levels for further processing by other digital devices. The output signal, $f_o$, from inverter 45 is taken along line 47 and the digital signal remains at the input signal frequency.

At node 49 the signal is split, with one branch proceeding along line 51 to a binary rate multiplier 55 which consists of individual multipliers 61, 63, 65 and 67. Multiplier 61 represents the most significant digit which is a number less than 1, but greater than 0. Multiplier 63 represents the next most significant digit, 65 the next and 67 the least most significant digit. The value of each digit is set by corresponding BCD switches 71, 73, 75 and 77, having adjustable settings. Thus, the switches govern the overall rate of multiplication of the input signal. For example, if the input signal is to be multiplied by 0.5, the digit five would be set in BCD switch 71 and all of the remaining BCD switches would be set with a zero. The output signal from the BCD multiplier 55 is taken along line 79. The smallest available signal now has a frequency of 0.0001 $f_o$ and the largest available signal has a frequency of 0.9999 $f_o$.

The signal along line 79 then proceeds to a filter indicated by the dashed line 81. The filter includes a pair of dividers 83 and 85. The first divider 83 has an output along line 87 which is a division by 10 and an output along line 89 which is a division by 2. Divider 85 has an output along line 9 which is another division by 10, or a total division thus far by 100 so that the input signal to switched capacitor filter 91 is the signal emerging from the binary rate multiplier divided by 100. This signal is clocked by the output from the binary rate multiplier, divided by 2, namely the signal appearing along line 89. Recall that equation (4) requires division by two. Division by 2 also provides a fifty percent duty cycle for approximating a sine wave with the switched capacity filter 91. Such filters are able to approximate various functions, including sine waves. The selected clock signal operates the filter at cutoff so that a good approximation to a sine wave is obtained.

The output from filter 91 is similar to the input signal, except that the sinusoidal output does not contain the rich harmonics which were present in the input signal to filter 91. This is especially important for those flowmeters which measure energy spectra. The output of the filter 91 is transmitted along line 93 to a balanced modulator inside of dashed line 95. The principal component of the balanced modulator is the diode bridge 97. This modulator is a balanced modulator with the input signal from line 93 applied at node 99, with an opposite node 101 being grounded. Across nodes 103 and 105 the Doppler input signal, and its inverse, are applied. The Doppler input signal is taken from node 49 along line 47 and applied to a first inverter 107. The output of this inverter is transmitted to node 103 as well as to a second inverter 109 where a complementary signal is derived and fed to node 105. The complementary signals are applied across the modulator. The application of the simulated Doppler shifted signal along line 93 to the diode bridge causes a ringing of the diodes, modulating the input signal applied across nodes 103 and 105. The modulator is a suppressed carrier, double side band modulator which produces an output signal with energy distributed symmetrically at frequencies above and below the frequency of the transmit signal. The transmit signal is applied as the carrier frequency, so it is suppressed. The side band frequencies appear as Doppler shifted return signals of the carrier or transmit frequency. The output signal is taken along line 111 and is fed back toward the input means. Node 113 forms an output for delivering the Doppler shifted return signal from the modulator 95 to a Doppler signal receiving transducer which may either be a terminal of 43 if connected to a two crystal Doppler flowmeter or terminal 41 in the case of a single crystal Doppler flowmeter. The modulated signal simulates the electrical signal response of a flowing liquid in a pipe of known geometry.

As a further test measure, it is desirable to take the input signal and measure its level. This is done by taking the signal along line 44 and sending it to threshold detector 121, an inverter. A jumper pin 123 selects between two resistors 125 and 127 for dividing the incoming voltage level depending upon whether a dual crystal flowmeter or a single crystal flowmeter is used. In the case of a dual crystal flowmeter, a lower resistive value in resistor 125 is used. If a single crystal flowmeter is used, a higher resistor value is used in resistor 127. The output of threshold detector 121 has a compatible logic level with the remaining circuitry. The output of the detector is fed to a reference amplifier 123 to adjust the gain of the signal to a desired level. The amplifier is an operational amplifier connected to produce an output signal along line 125 which carries a voltage proportional to the signal strength of the input signal. Output terminal 126 is a test point for checking the flowmeter output level and not a critical part of the present invention. The output of the amplifier 123 is also fed to the positive input of a comparator 127. The negative input is connected to a reference voltage along line 129 so long as the input to the comparator exceeds the preset reference, a visual indicator 131, an LED, is illuminated by the output signal. This signifies sufficient signal strength for operation of the flowmeter as well as for the simulator circuit of the present invention.

The following appendix gives the identification of significant circuit components employed in the circuit of FIG. 3:

| Appendix | |
| --- | --- |
| Inverters 45, 107, 109, 121 | 4001 |
| Binary multipliers 61, 63, 65, 67 | 4527 |
| Dividers 83, 85 | 4518 |
| Switched capacitor filter 91 | LF 6-50 |
| Diodes in modulator 97 | 1N 914A |
| Op. amps. 123, 127 | LF 6-50 |

I claim:
1. A circuit simulating the electrical signal response of a flowing fluid whose velocity is to be measured by a Doppler flowmeter having an electrical-to-acoustic energy transducer acting as a signal transmitter and the same or another transducer acting as a signal receiver comprising,
  input means for acquiring an electrical Doppler transmit signal from a Doppler flowmeter, said transmit signal having a transmit frequency,
  circuit means, connected to said input means, for modifying said transmit frequency by a preselected amount to produce a simulated Doppler shifted signal,
  modulator means communicating with said input means and said circuit means for modulating the Doppler transmit signal with the simulated Doppler shifted signal in a manner producing frequencies above and below the transmit frequency, forming a Doppler shifted return signal, and
  output means for delivering the Doppler shifted return signal from said modulator means to a Doppler signal receiver.

2. The circuit of claim 1 wherein said circuit means for modifying said transmit frequency comprises a binary rate multiplier means connected to said input means for multiplying the frequency of the Doppler transmit signal by a number greater than zero and less than one thereby producing said simulated Doppler shifted signal.

3. The circuit of claim 1 further defined by a low pass filter means interposed between said circuit means for modifying said transmit frequency and said modulator means for reducing harmonics in the simulater Doppler shifted signal applied to said aid modulator means.

4. The circuit of claim 1 wherein said low pass filter is a switched capacitor filter.

5. The circuit of claim 4 wherein said switched capacitor filter is preceded by a pair of divider means, including a first divider means for receiving said simulated Doppler shifted signal and dividing said signal by two at a first output and by ten at a second output, the first output applied as a clock pulse to said switched capacitor filter and the second output applied as an input to a second divider means, the second divider means dividing its input by ten again with the output of the second divider means applied as an input to said switched capacitor filter, the signals from said divider means applied to said switched capacitor filter serving to operate the filter at cutoff thereby producing a sinusoidal output wave.

6. The circuit of claim 1 further comprising sampling circuit means for sampling the Doppler transmit signal and producing a voltage proportional to signal strength in response thereto.

7. The circuit of claim 1 wherein said modulator means is a double side band balanced modulator.

8. The circuit of claim 7 wherein said balanced modulator has a first pair of terminals across which said Doppler transmit signal is applied and a second pair of terminals across which said simulated Doppler shifted signal is applied, said second pair of terminals also delivering said simulated Doppler shifted signal to said output means.

9. The circuit of claim 1 wherein said input means comprises a signal input terminal means of a combined transmitting and receiving transducer.

10. The circuit of claim 1 wherein said input means comprises a signal input terminal means for separate transmitting and receiving transducers.

11. A circuit simulating the electrical signal response of a flowing fluid whose velocity is to be measured by a Doppler flowmeter having an electrical-to-acoustic energy transducer acting as a signal transmitter and the same or another transducer acting as a signal receiver comprising,
   electrical signal input and output means for respectively acquiring and delivering an electrical Doppler transmit signal from and to a Doppler flowmeter, said transmit signal having a transmit pulse frequency,
   a pulse frequency multiplying means for receiving said transmit pulse frequency and modifying said transmit pulse frequency by a preset amount thereby forming a simulated Doppler shifted pulse signal,
   a wave shaping circuit means connected to receive said Doppler shifted pulse for converting pulses to approximate sine waves thereby forming a simulated Doppler shifted sine wave signal, and
   modulator means communicating with said input and output means and said wave shaping circuit means for modulating the Doppler transmit signal with the simulated Doppler shifted sine wave signal producing frequencies above and below the transmit pulse frequency thereby producing a Doppler shifted return signal at said output means.

12. The circuit of claim 11 wherein said pulse frequency multiplying means comprises a frequency multiplier having means for setting the multiplier of the transmit pulse frequency in a range greater than zero and less than one.

13. The circuit of claim 12 wherein said frequency multiplier comprises a plurality of counters, each connected to a BCD switch, whereby said multiplier is set in said BCD switches.

14. A method for electrically simulating the flow of fluid in a pipe for flow velocity measurement by a Doppler flowmeter comprising,
   acquiring an electrical signal being fed to the electrical-to-acoustic energy transducer of a Doppler flowmeter having a characteristic transmit frequency,
   electrically modifying the characteristic transmit frequency signal to produce a simulated Doppler shifted signal,
   modulating the transmit frequency signal with the simulated Doppler shifted signal producing signals with frequencies above and below the transmit frequency thereby producing a Doppler shifted return signal, and
   applying the Doppler shifted return signal to a Doppler flowmeter receiving transducer.

15. The method of claim 14 wherein said modifying of the Doppler transmit frequency signal is by multiplying the Doppler transmit frequency signal by a rate greater than zero but less than one to produce a simulated Doppler shifted signal.

16. The method of claim 14 further defined by shaping said simulated Doppler shifted signal to a sine wave approximation prior to said modulating step.

* * * * *